(12) United States Patent
Lin (10) Patent No.: US 10,974,828 B2
(45) Date of Patent: Apr. 13, 2021

(54) SMALL SOLAR-POWERED UNMANNED AIRCRAFT

(71) Applicant: PSJ INTERNATIONAL LTD., Tortola (VG)

(72) Inventor: Ching-Fuh Lin, Taipei (TW)

(73) Assignee: PSJ International Ltd., Tortola (VG)

( * ) Notice: Subject to any disclaimer, the term of this patent is extended or adjusted under 35 U.S.C. 154(b) by 274 days.

(21) Appl. No.: 16/167,291

(22) Filed: Oct. 22, 2018

(65) Prior Publication Data
US 2019/0161187 A1 May 30, 2019

(30) Foreign Application Priority Data

Nov. 29, 2017 (TW) ................................. 106141596

(51) Int. Cl.
*B64D 27/24* (2006.01)
*B64C 39/02* (2006.01)
*H02S 20/30* (2014.01)

(52) U.S. Cl.
CPC ............ *B64C 39/024* (2013.01); *B64D 27/24* (2013.01); *H02S 20/30* (2014.12); *B64C 2201/042* (2013.01); *B64D 2211/00* (2013.01)

(58) Field of Classification Search
CPC ....................... B64D 2211/00; B64C 2201/042
See application file for complete search history.

(56) References Cited

U.S. PATENT DOCUMENTS

2013/0285440 A1 * 10/2013 Pan ........................ H01L 31/046
307/9.1

FOREIGN PATENT DOCUMENTS

| CN | 203491953   | * | 3/2014 |
| CN | 203491953 U | * | 3/2014 |
| CN | 203491953 U |   | 3/2014 |
| CN | 204776058   | * | 11/2015 |
| CN | 204776058 U | * | 11/2015 |
| CN | 204776058 U |   | 11/2015 |

OTHER PUBLICATIONS

Office Action dated Jun. 4, 2018 in corresponding Taiwan Patent Application No. 106141596.

* cited by examiner

*Primary Examiner* — Philip J Bonzell
*Assistant Examiner* — Tye William Abell
(74) *Attorney, Agent, or Firm* — Donald E. Stout; Stout, Uxa & Buyan, LLP (57) ABSTRACT

A small unmanned aircraft is disclosed. By delicate design and limitation of the specification, the small unmanned aircraft is enabled to fly by solar energy produced from a solar cell module. Preferably the small unmanned aircraft has a dimension less than 60 cm×60 cm.

14 Claims, 9 Drawing Sheets

FIG. 7B

SMALL SOLAR-POWERED UNMANNED AIRCRAFT

CROSS-REFERENCE TO RELATED APPLICATIONS

The entire contents of Taiwan Patent Application No. 106141596, filed on Nov. 29, 2017, to which this application claims priority, are expressly incorporated herein by reference.

BACKGROUND OF THE INVENTION

1. Field of the Invention

The present invention relates to an unmanned aerial vehicle (UAV) and particularly relates to the design and construction of a small-scale rotorcraft UAV system.

2. Description of Related Art

Today, manned fixed-wing aircraft already have a record of five days of continuous flying using solar power. However, manned fixed-wing aircraft are large aircraft and there is currently no way for small-scale UAVs, especially for rotorcraft UAVs, to use solar power for their flight.

Due to the heavy weight of the current solar cell module, a small UAV, especially a small UAV with a size less than 50×50 cm$^2$ or a body area less than 50 cm in diameter, cannot support a solar cell module for providing power to fly. Therefore, there is still no small-scale UAV that uses solar energy as its main power source.

SUMMARY OF THE INVENTION

An object of this invention is to provide a small-scale rotorcraft unmanned aerial vehicle (UAV) powered by solar energy.

According to an embodiment of the present invention, a small UAV comprises a plurality of propellers, one or more motors, a frame, a circuit board, and a solar cell module. The propellers propel the small UAV. The one or more motors are used to drive the plurality of propellers. The frame supports the propellers and the one or more motors. The circuit board electrically connects with the one or more motors. The solar cell module electrically connects with the circuit board. An angle between solar cells of the solar cell module and the plane of rotation of the propellers is less than 75 degrees. The solar cell module provides power for the one or more motors to drive the propellers, and the size of the small UAV is less than 60 cm×60 cm.

In one embodiment, the size of the small UAV ranges between 15 cm×15 cm and 60 cm×60 cm.

In one embodiment, the size of the small UAV is less than 50 cm×50 cm.

In one embodiment, the efficiency of each motor is Y (g/W), and Y satisfies Y≥(G0/S×A×η)+G1/S×η, where G0 (g) denotes the total weight of the frame, the one or more motors, the propellers, and the circuit board, G1 (g/cm$^2$) denotes the weight per unit area of the solar cell module, A denotes the surface area of the solar cell module, η denotes the conversion efficiency of the solar cell module, and S (W/cm$^2$) denotes the intensity of the sun.

In one embodiment, the weight per unit area of the solar cell module is G1 (g/cm2), and G1 satisfies G1≤Y×S×η−G0/A, where G0 (g) denotes the total weight of the frame, the one or more motors, the propellers, and the circuit board, A denotes the surface area of the solar cell module, η denotes the conversion efficiency of the solar cell module, and S (W/cm$^2$) denotes the intensity of the sun.

In one embodiment, the small UAV carries a component with a weight C, and G1 satisfies the formula: G1≤Y×S×η−(G0+C)/A.

In one embodiment, the surface area of the solar cell module is At, and At satisfies the formula: G0/(Y×Ws−Wu), where Ws (W/cm$^2$) denotes the power generated per unit area of the solar cell module, G0 (g) denotes the total weight of the frame, the one or more motors, the propellers, and the circuit board, and Y (g/W) denotes the efficiency of each motor.

In one embodiment, the weight per unit area of the solar cell module ranges between 0.01 g/cm$^2$ and 0.15 g/cm$^2$.

In one embodiment, the weight per unit area of the solar cell module ranges between 0.035 g/cm$^2$ and 0.1 g/cm$^2$.

In one embodiment, the total weight of the frame, the one or more motors, the propellers, and the circuit board ranges between 15 g and 60 g.

In one embodiment, the efficiency of each motor ranges between 4 g/W and 15 g/W.

In one embodiment, the power generated per unit area of the solar cell module ranges between 0.012 W/cm$^2$ and 0.075 W/cm$^2$.

In one embodiment, the weight of the solar cell module is equal to or less than 27 g.

In one embodiment, the total weight of the small UAV is no more than 150 g.

In one embodiment, the number of the one or more motors equals to the number of the propellers, and each propeller is driven by one motor.

In one embodiment, the frame comprises a plurality of supporting strips and a plurality of supporting arms. In one embodiment, the supporting strips and supporting arms are made of carbon fibers.

DETAILED DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts. It should be noted that any drawing presented are in simplified form and are not to precise scale. In reference to the disclosure herein, for purposes of convenience and clarity only, directional terms are used with respect to the accompanying drawing and should not be construed to limit the scope of the invention in any manner.

This invention proposes a manner and system for small unmanned aerial vehicles (UAVs) to fly by the solar energy. In the context of the present invention, a small UAV refers to a UAV having a length scale or diameter between 15 cm and 60 cm. Small UAVs are preferably square, but can also be round or polygonal or other shapes. Preferably, the size of the UAV is less than or equal to 60 cm×60 cm. In the context of the present invention, the small UAV refers a rotorcraft unmanned aerial vehicle that can take off and land vertically with its propellers rotating horizontally or parallel to the ground. Preferably, the small UAV of the present invention has a plurality of propellers and a solar cell module, which may include many solar cells providing the power required for the propellers to rotate, and the angle between the solar cells and the surface of rotation of the propellers is less than 75 degree.

By delicate calculation and analysis, the weight of a small UAV consists of several parts, each with different proportions as the size of the UAV increases. For example, the weight of an electronic part for controlling the UAV does not significantly increase with the size of UAV, and it is possible to define such weight as a fixed weight, W0. In addition, a weight of a part, such as the weight of multi-wings of a rotorcraft UAV, is approximately proportionally increased with the length scale or fuselage length of UAV, and such weight is defined as a first weight, W1. A second weight, W2, is a weight of a part approximately proportionally increased with the area of UAV. A third weight, W3, is a weight of a part (such as motor) approximately proportionally increased with the volume of UAV. Accordingly, the total weight of UAV can be expressed by the formula:

$$Wt = W0 + W1 + W2 + W3 = W0 + ax + bx^2 + cx^3,$$

where W0, a, b, and c are constants and design parameters of a UAV, and x is the size (e.g., a length scale) of UAV.

When the size of the UAV is small, the proportion of the first two items (W0+W1) is large. When the size of the UAV is large, the proportion of the latter two items (W2+W3) is large.

Lift is the force that holds the UAV in the air and is determined by the motor. The larger the motor is, the more efficient it converts power to lift. For example, the 2212 brushless motor has a lift-conversion efficiency of about 6 g/W. In contrast, some of the 110× series motors have a lift-conversion efficiency of 2 g/W. Typically the lift-conversion efficiency of a large motor is larger than that of a small motor.

The large UAVs have a large lift because they use a large motor and have a small proportion of the first two items (W0+W1) and a large proportion of the latter two items (W2+W3). Using the large motor, the large UAVs can overcome the increased weight as the fuselage length is increased. The small UAVs have a large proportion of the first two items (W0+W1) and use a small motor with a poor lift-conversion efficiency. Accordingly, the small motor has a limited load capacity after it overcome the weight of the first two items (W0+W1).

The characteristics of the solar cell module are then carefully considered. The power of the solar cell module is from the sun, and the solar power is about proportional to the area of the solar cell module:

$$Ps = ax^2,$$

where Ps is the power of sunlight, and x is the length scale of the solar cell module.

Therefore, when the area of the solar cell module is large, the UAV can obtain enough energy required to lift. When the area of the solar cell module is small, the power of the sunlight becomes small and the proportion of the first two items (W0+W1) is large, so that the UAV cannot obtain sufficient energy for flight.

Therefore, in order to allow small UAVs to fly by the solar energy, careful consideration must be given to the relationship between motors and solar cell modules of the small UAVs.

As an example, if a UAV uses a motor with a lift-conversion efficiency of 2 g/W (lifting weight per watt) and a common available silicon solar cell with a thickness of 200 μm, and the weight per unit area of the solar cell module (0.04658 g/cm$^2$) can be calculated according to the density of silicon, 2.329 g/cm$^3$.

Next, a currently available good silicon solar cell has an efficiency of 20%, and the intensity of sun is 0.1 W/cm$^2$. The power generated per unit area of the silicon solar cell is 0.1 (W/cm$^2$)·20%=0.02 W/cm$^2$, from which it can be calculated that the required lift-conversion efficiency of the motor is at least 2.329 g/W (0.04658 g/cm$^2$/0.02 W/cm$^2$=2.329 g/W). That is, a motor with a lift-conversion efficiency of 2 g/W is not able to lift the solar cell module. The motor must have a lift-conversion efficiency of at least 2.329 g/W to lift the solar cell module.

On the other hand, if the thickness of the silicon solar cell is reduced to 150 μm, the weight per unit area of the solar cell is 0.034935 g/cm$^2$. According to the same calculation before, the lift-conversion efficiency of the motor must be at least 1.74675 g/W to lift this silicon solar cell.

If the silicon solar cell is replaced by other types of solar cell, the weight per unit area of the solar cell may be reduced, and the required lift-conversion efficiency of the motor can be further decreased.

So far, an important relationship can be obtained. Assume that the conversion efficiency of the solar cell module is q, and then the power generated per unit area of the solar cell module is equal to S×η, where S is the sunlight intensity (W/cm$^2$). If the weight per unit area of the solar cell module is G1 (g/cm$^2$), the lift-conversion efficiency of the motor must be at least greater than:

$$G1/(S \times \eta) \qquad \text{equation (1).}$$

According to equation (1), the smaller G1, the smaller required lift-conversion efficiency of the motor.

With further consideration, UAVs bear not only the weight of solar cells but also the weight of the fuselage, so that the lift-conversion efficiency of motor requires even higher.

Assume that the weight of the fuselage (including the frame, the motor(s), the electronic parts, and the like) is G0 (g), the weight per unit area of the solar cell module is G1 (g/cm$^2$), the area of the solar cell module is A, and then the total weight of UAV is G0+G1×A, the total power generated by the solar cell module is S×A×η, and the lift-conversion efficiency of the motor must be greater than:

$$(G0+G1\times A)/S\times A\times \eta = (G0/A+G1)/S\times \eta = (G0/S\times A\times \eta)+G1/S\times \eta \quad \text{equation (2).}$$

Compared with equation (1), equation (2) has additional quantity of lift-conversion efficiency (G0/S×A×η) to be required. According to equation (2), the larger area of the solar cell module has, the smaller lift-conversion efficiency of the motor is required. Large UAVs have advantages over small UAVs, but the small UAVs are also possible to lift themselves as long as the lift-conversion efficiency of the motor can meet the requirement of equation (2).

In another aspect, current available motors have limited lift-conversion efficiency. Therefore, it is also necessary to consider what conditions the solar cell module must meet to accommodate the limited lift-conversion efficiency.

If the lift-conversion efficiency of the motor is Y g/W and assume that the weight of the fuselage (including the frame, the motor(s), and the electronic parts) is G0 and the area of the solar cell module is A (the area A cannot be too large to avoid the UAV being too large), then the total power generated by the solar cell module is S×A×η.

In addition, assume that the weight per unit area of the solar cell module is G1 (g/cm$^2$), and then it is desirable that Y≥(G0+G1×A)/S×A×η=(G0/S×A×η))+G1/S×η. After computation can obtain:

$$G1 \leq Y\times S\times \eta - G0/A \quad \text{Equation (3)}$$

According to equation (3), the weight per unit area of the solar cell module, G1, cannot be too large; otherwise the UAV cannot fly using the solar power. In addition, the bigger the area of the solar cell module (A), the smaller the ratio G0/A. And the weight per unit area of the solar cell module, G1, can increase with the area of the solar cell module (A). In addition, if the conversion efficiency of the solar cell module (q) is prompted, the weight per unit area of the solar cell module G1 can also be increased. Alternatively, the weight per unit area of the solar cell module G1 can be increased if the UAV is designed for an area with intense sunlight.

Then, a situation is further considered that the UAV is able to carry an object with extra weight. Assume that the weight of born object is C, and then the total weight of the UAV is G0+C+G1×A, and the total power generated by the solar cell module is S×A×η. At this situation, it is desirable that Y≥(G0+C+G1×A)/S×A×η=((G0+C)/S×A×η))+G1/S×η, and after computation can obtain:

$$G1 \leq Y\times S\times \eta - (G0+C)/A \quad \text{Equation (4).}$$

Compared with equation (3), equation (4) requires a smaller G1. That is, the weight per unit area of the solar cell module must be smaller; otherwise the UAV cannot fly and carry the object with weight C using the solar energy. In addition, the larger the area of the solar cell module A, the smaller the ratio (G0+C)/A. And the weight per unit area of the solar cell module G1 can increase with the area of the solar cell module A. In addition, if the conversion efficiency of the solar cell module (η) is increased, or the UAV is designed for an area with intense sunlight, the weight per unit area of the solar cell module G1 can also be increased.

Next, take the brushless motor and the coreless (brushed) motor as two examples to evaluate the conditions for taking off a small UAV. First, a UAV using a brushless motor is considered. Small brushless motors usually have small lift-conversion efficiency less than 3.5 g/W. Assume that the lift-conversion efficiency of the brushless motor is 2.5 g/W, conservatively. If the total weight of UAV (including the weight of solar cell module) is 70 g, then the power required to fly is 28 W. Assume that the efficiency of the solar cell module is 20%, and then the required area of the solar cell module is about 28/200 m$^2$=1400 cm$^2$. The weight of current available silicon solar cell module with an area 1400 cm$^2$ will exceed 65 g. Since the total weight of UAV is 70 g, the weight of motor, frame, and electronic parts must be less than 5 g, which is very difficult to achieve.

If the small brushless motor has a lift-conversion efficiency of 5 g/W, the fuselage weight (including the weight of frame, motor, and electronic parts) of the UAV is generally 50 g, and the weight of a silicon solar cell module (with thickness 200 μm and efficiency of 20%), K, has been assumed, then the total weight of UAV is 50+K and the power required to take off is at least (50+K)/5=10+K/5 (W), and the solar cell module needs an area At (≥500+10K) to produce these powers. The weight of the solar cell module, K=At×0.02×2.329=0.04658At. After computation, we can obtain At≥500+0.4658At and At≥936 cm$^2$. A square UAV (and a square solar cell module) with a length scale of about 31 cm has the opportunity to fly using the solar energy, and the total weight of the UAV is 50+44=94 g.

In another example, a coreless (brushed) motor with a lift-conversion efficiency of 5 g/W is used, and the fuselage weight (including the weight of frame, motor, and electronic parts) of the UAV is reduced to 40 g. After computation similar to the above example, the following equation can be obtained: At≥400+0.4658At and At≥749 cm$^2$. A square UAV with a length scale of about 27.5 cm has the opportunity to fly using this solar cell module. The total weight of the UAV is 40+35=75 g. If this UAV is loaded with other components, such as a small camera weighing 10 g, and then this UAV has a fuselage weight of 50 g same as the previous example, so that a square UAV employing a square solar cell module with a length of about 31 cm has the opportunity to fly using the solar energy, and the total weight of the UAV is 50+44=94 g.

In another example, the lift-conversion efficiency is 6 g/W, the fuselage weight (including the weight of frame, motor, and electronic parts) of the UAV is 40 g, and the weight of a silicon solar cell module (with thickness 200 μm and efficiency of 20%), K, has been assumed, then the total weight of UAV is 40+K and the power required to take off is at least (40+K)/6=20/3+K/6 (W), and the solar cell module needs an area At (≥1000/3+25K/3) to produce these powers. The weight of the solar cell module, K=At×0.02×2.329=0.04658At. After computation, we obtain At≥1000/3+0.3882At and At≥545 cm$^2$. A square UAV (and a square solar cell module) with a length scale of about 23.5 cm has the opportunity to fly using the solar energy, and the total weight of the UAV is 40+25=65 g.

If this UAV is loaded with other components, such as a small camera weighing 10 g, and then this UAV has a fuselage weight of 50 g same as the previous example but different in lift-conversion efficiency. Assume that the weight of a silicon solar cell module (with thickness 200 μm and efficiency of 20%) is K, then the total weight of UAV is 50+K and the power required to take off is at least (50+K)/6=25/3+K/6 (W), and the solar cell module must have an area At (≥1250/3+25K/3) to produce these powers. The weight of the solar cell module, K=At×0.02×2.329=0.04658At. After computation, we obtain At≥1250/3+0.3882At and At≥681 cm². A square UAV (and a square solar cell module) with a length scale of about 26.1 cm has the opportunity to fly using the solar energy, and the total weight of the UAV is 50+32=82 g.

According to the preceding examples, the relationships between the lift-conversion efficiencies and the area of the solar cell module can be obtained. Assume that the lift-conversion efficiency of the motor is Y (g/W), the fuselage weight (including the weight of frame, motor, and electronic parts) of the UAV is G0 (g), and the weight of the solar cell module (with thickness 200 μm and efficiency of 20%) is K (g), and then the total weight of UAV is G0+K, and the power required to take off is at least greater than (G0+K)/η, that is, 0.02 At≥(G0+K)/Y, where At (cm²) is the area of the solar cell module. The K of the above formula is substituted by the relationship At×0.02×2.329=0.04658At=K, and then obtain 0.02At≥(G0+0.04658At)/Y. After computation an equation is obtained as follows:

$$(0.02-0.04658/\eta)At \geq G0/Y \qquad \text{equation (5)}$$

Figure 1:
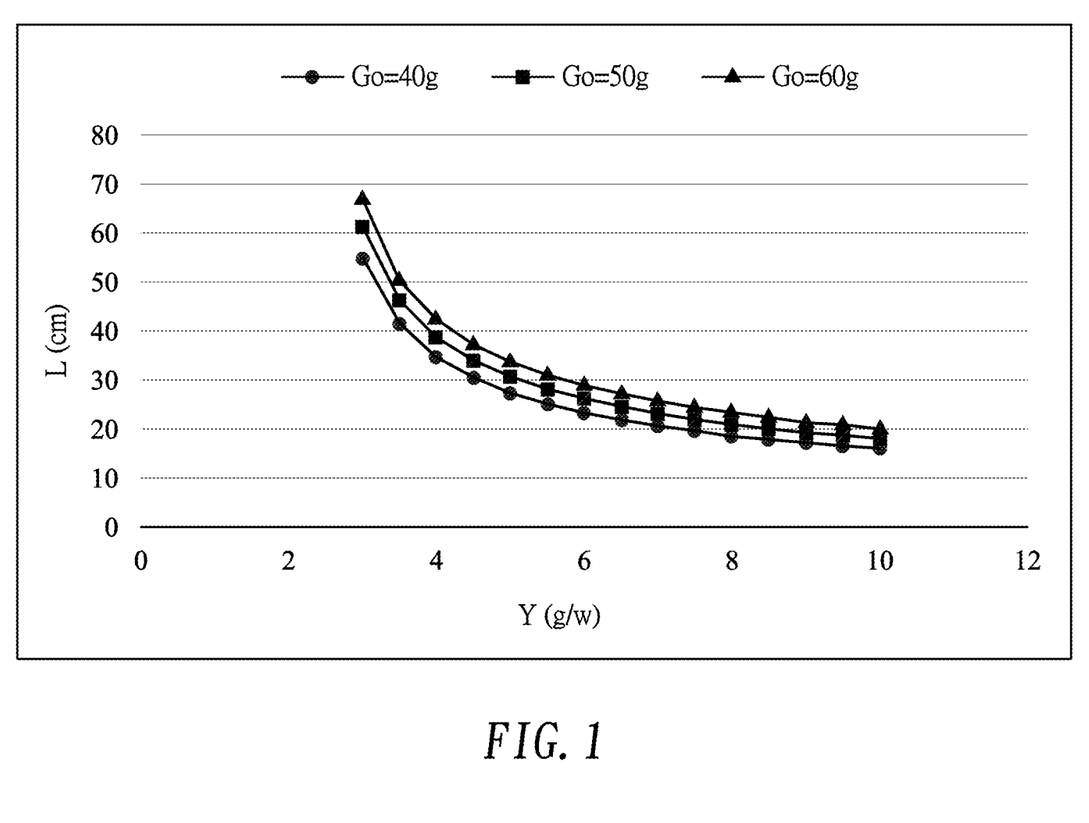
FIG. 1 is a chart showing relationships between the size of a solar cell module and the efficiency of a motor of a small rotorcraft unmanned aerial vehicle (UAV) in accordance with an embodiment of this invention.

FIG. 1 is a chart showing the relationships between the lift-conversion efficiencies and the area of the solar cell module by setting the fuselage weights G0 as 60 g, 50 g, and 40 g, respectively. The y-axis (vertical-axis) is the length scale of the UAV, L (cm, At=L²), and x-axis (horizontal-axis) is lift-conversion efficiencies Y(g/W) of motors.

Referring to FIG. 1, in some embodiments the area of the UAV is essentially the same as the area of the solar cell module. In some embodiments, the UAV may be square-shaped having a length scale between 15 cm and 60 cm, a motor with a lift-conversion efficiency between 4 g/W and 15 g/W, and a fuselage weight between 15 g and 60 g.

Referring to FIG. 1, when the lift-conversion efficiency of motor is greater than 5 g/W and the fuselage weight is light (preferably between 40 g and 50 g), the length scale of the solar cell module can be less than 20 cm.

On the other hand, there are many kinds of solar cells, and some of them have a weight per unit area smaller than that of others. If the weight per unit area of the solar cell module is reduced, the total weight of the UAV can also be decreased. If the weight per unit area of the solar cell module is Wu, the power generated per unit area of the solar cell module is 0.02 W/cm² (efficiency 20% assumed), the lift-conversion efficiency of motor is 5 g/W, the fuselage weight (including the weight of frame, motor, and electronic parts) is 40 g, the total area of the solar cell module is At, and then the total weight of the UAV is 40+AtWu, the total power generated by the solar cell module is 0.02At (W), the power required to take off and fly the UAV is (40+AtWu)/5, so that 0.02At≥(40+AtWu)/5, after computation we obtain:

$$(0.02-Wu/5)At \geq 8 \qquad \text{equation (6)}$$

Figure 2:
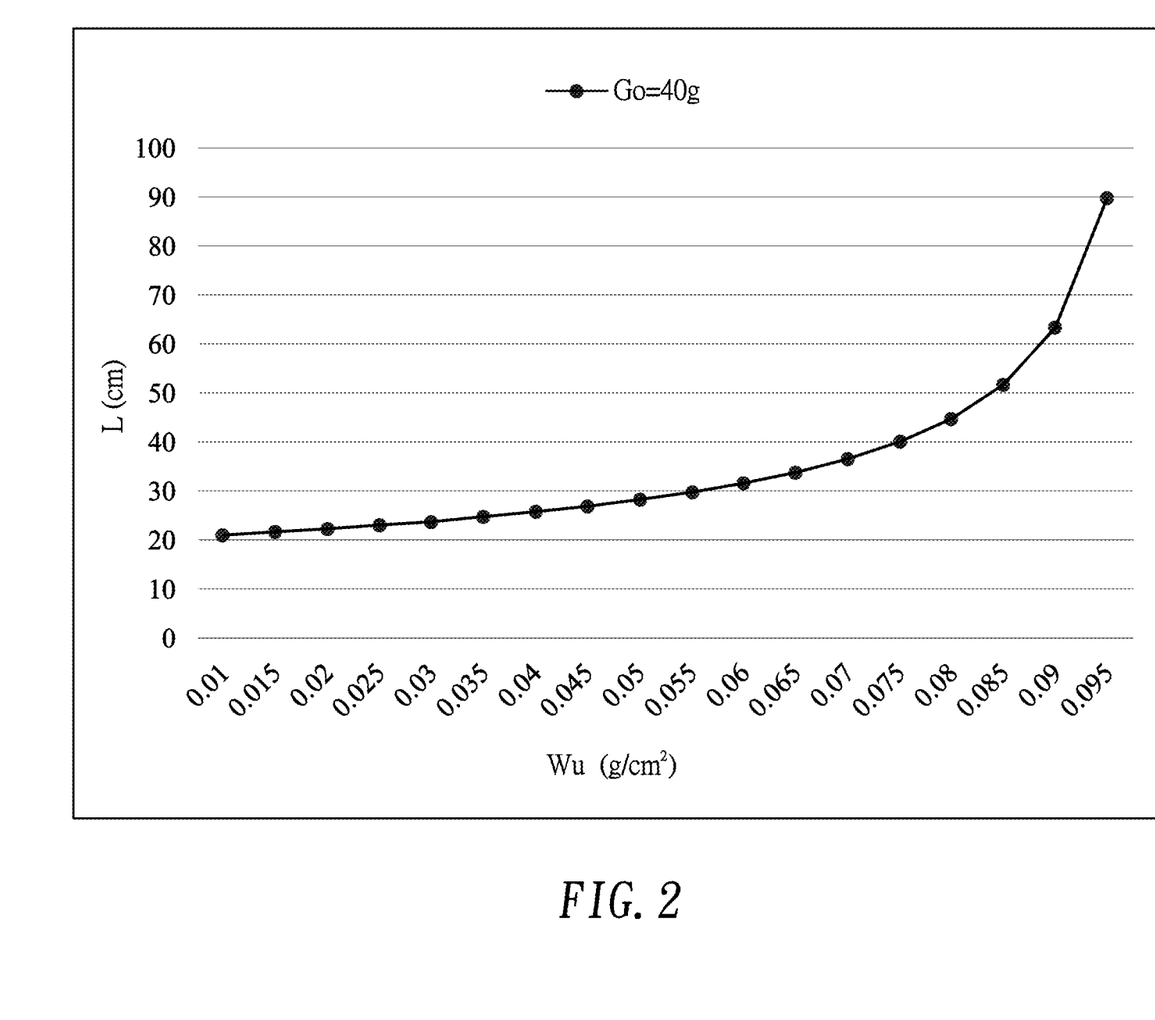
FIG. 2 is a chart showing relationships between the size and the weight per unit area of a solar cell module of a small rotorcraft unmanned aerial vehicle (UAV) in accordance with an embodiment of this invention.

FIG. 2 is a chart showing relationships between the sizes (length scales) and weights per unit area of the solar cell module according to equation (6), where y-axis (vertical axis) is the length scale of the solar cell module (L (cm), At=L²), x-axis (horizontal-axis) is the weight per unit area of solar cell module (g/cm²), and the fuselage weight is fixed at 40 g.

In some embodiments, referring to FIG. 2, the area of the solar cell module ranges between 21 cm×21 cm and 63 cm×63 cm, and the weight per unit area of the solar cell module ranges between 0.01 g/cm² and 0.15 g/cm². In some embodiments, the weight per unit area of the solar cell module ranges between 0.035 g/cm² and 0.1 g/cm². In a particular embodiment, the area of the solar cell module is about 50 cm² essentially same as the area of the UAV, the weight per unit area of the solar cell module is 0.085 g/cm², and the fuselage weight (may plus a loading weight) is 40 g.

Referring to FIG. 2, if the weight per unit area of the solar cell module is reduced, then the total weight of the UAV is also decreased, so that the area and hence the length scale of the solar cell module can be reduced.

Next, let's consider all variables. Assume that the power generated per unit area of the solar cell module is Ws, the weight per unit area of the solar cell module is Wu, the fuselage weight (including the weight of frame, motor, and electronic parts) is G0, and the lift-conversion efficiency of motor is Y (g/W). By computation similar to the above examples, an formula can be obtained: (Ws−Wu/Y)At≥G0/Y. After computation, the following equation can be obtained: (Y×Ws−Wu)At≥G0 or $$At \geq G0/(Y \times Ws - Wu) \qquad \text{equation (7)}$$

Figure 3:
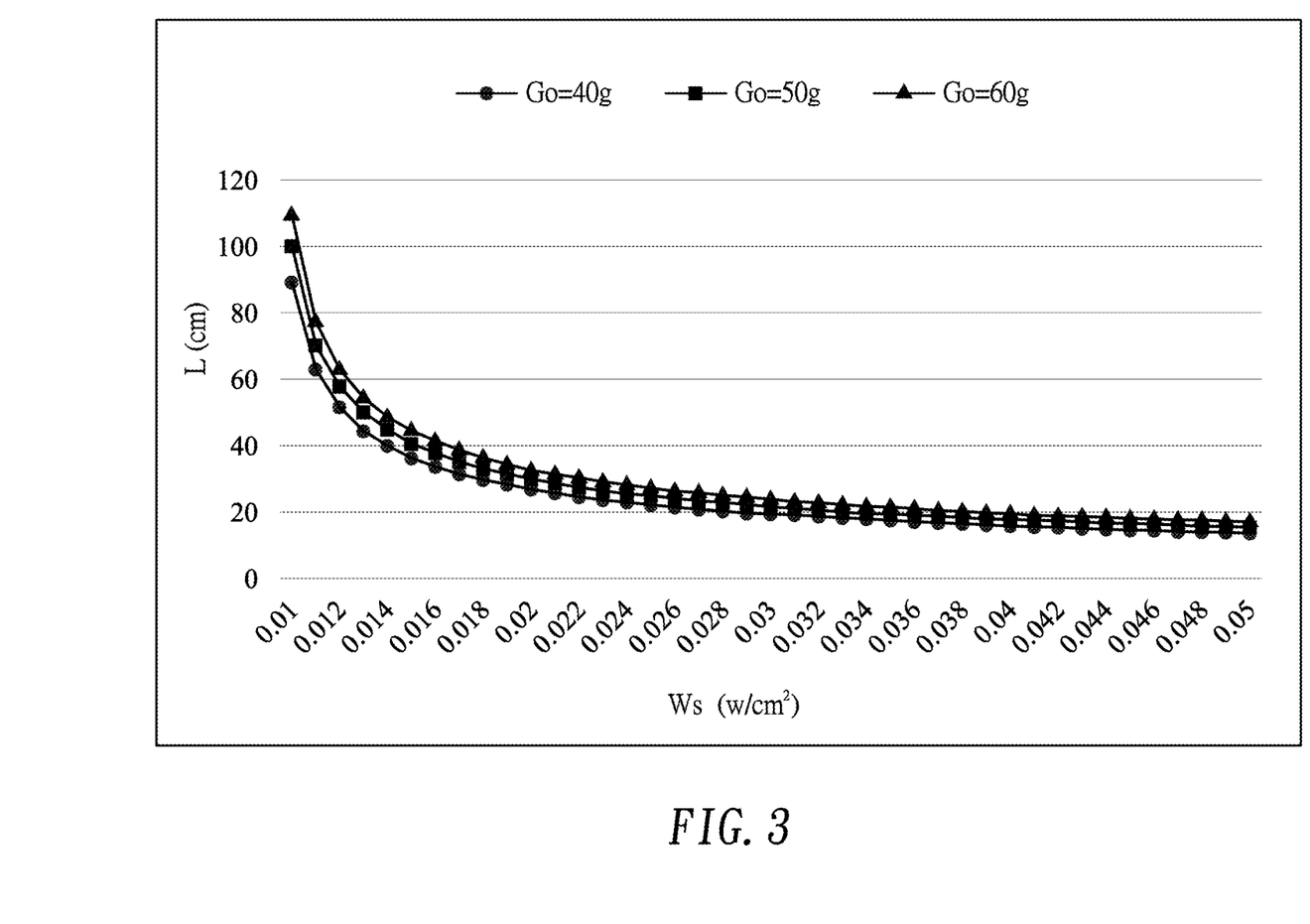
FIG. 3 is a chart showing relationships between the size and the power generated per unit area of a solar cell module of a small rotorcraft unmanned aerial vehicle (UAV) in accordance with an embodiment of this invention.

FIG. 3 is a chart showing relationships between the sizes (length scales) and power generated per unit area of the solar cell module according to equation (7), where y-axis (vertical axis) is the length scale of the solar cell module (L (cm), At=L²), x-axis (horizontal-axis) is the power generated per unit area of solar cell module (W/cm²), and where the lift-conversion efficiency of motor is fixed at Y=5 g/W, the weight per unit area of the solar cell module is fixed at Wu=0.045 g/cm², and the fuselage weight is fixed at 60 g, 50 g, and 40 g, respectively.

In some embodiments, referring to FIG. 3, the power generated per unit area of the solar cell module ranges between 0.012 W/cm² and 0.075 W/cm².

Referring to FIG. 3, when the power generated per unit area of the solar cell module is increased, the area of the solar cell module can be reduced. When the power generated per unit area of the solar cell module is increased to 0.03 W/cm² (identifying with a solar cell module having efficiency 30%), the length scale of the solar cell module can be less than 20 cm. In addition, as the power generated per unit area of the solar cell module is increased, the fuselage weight can be also increased even if merely a little area of the solar cell module is increased.

Figure 4:
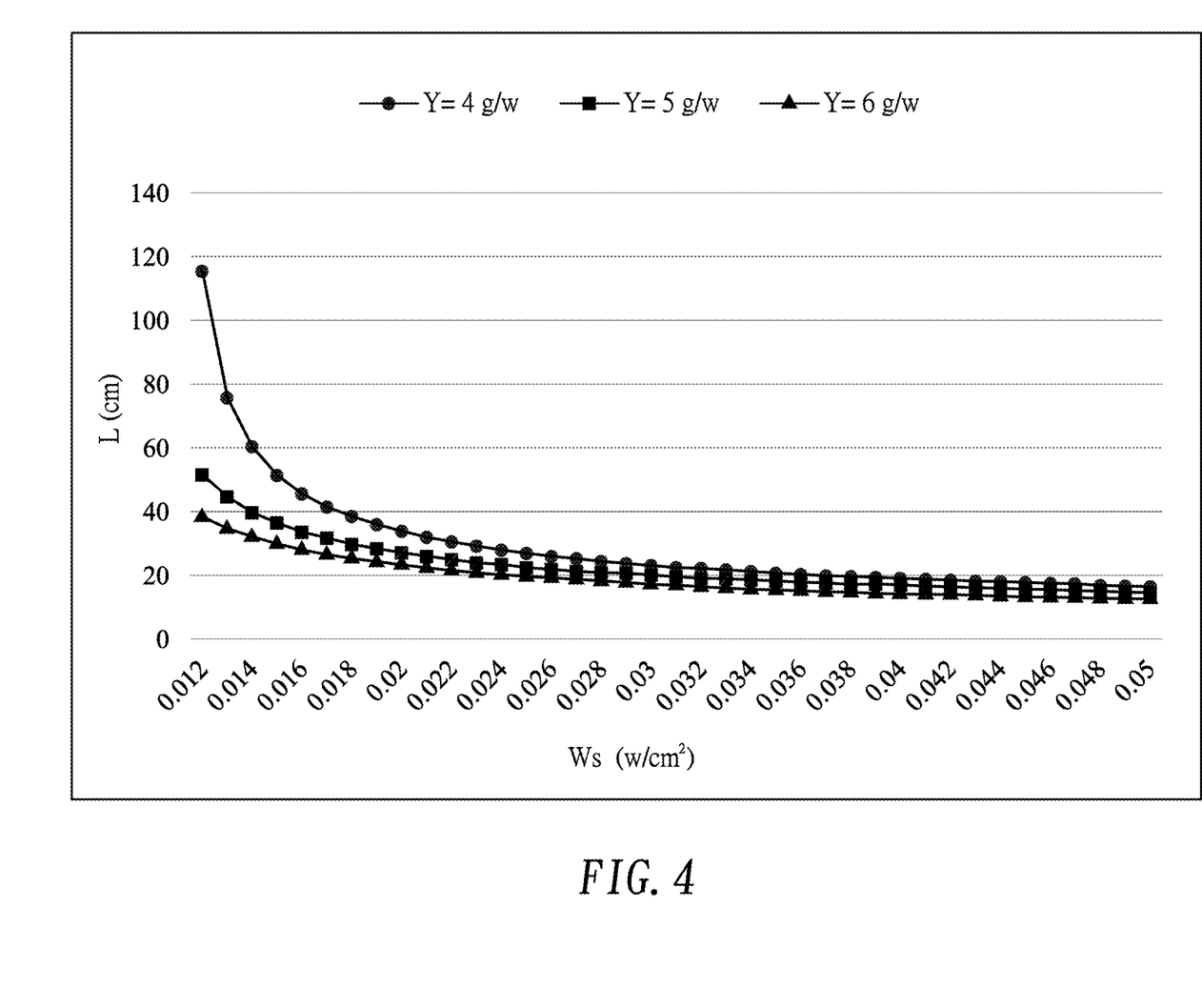
FIG. 4 is a chart showing relationships between the size and the power generated per unit area of a solar cell module of a small rotorcraft unmanned aerial vehicle (UAV) in accordance with an embodiment of this invention.

FIG. 4 is a chart showing relationships between the sizes (length scales) and power generated per unit area of the solar cell module according to equation (7), where y-axis (vertical axis) is the length scale of solar cell module (L (cm), At=L²), x-axis (horizontal-axis) is the power generated per unit area of solar cell module (W/cm²), and where the fuselage weight is fixed at 40 g, the weight per unit area of the solar cell module is fixed at Wu=0.045 g/cm², and the lift-conversion efficiency of motor is fixed at 4 g/W, 5 g/W, and 6 g/W, respectively.

Referring to FIG. 4, when the power generated per unit area of the solar cell module is increased to 0.03 W/cm² (identifying with a solar cell module having efficiency 30%), the length scale of the solar cell module can be less than 20 cm. In addition, as the power generated per unit area of the solar cell module is increased and an optional little area of the solar cell module is further increased, a small lift-conversion efficiency of motor (e.g., 4 g/W) can be selected.

Figure 5:
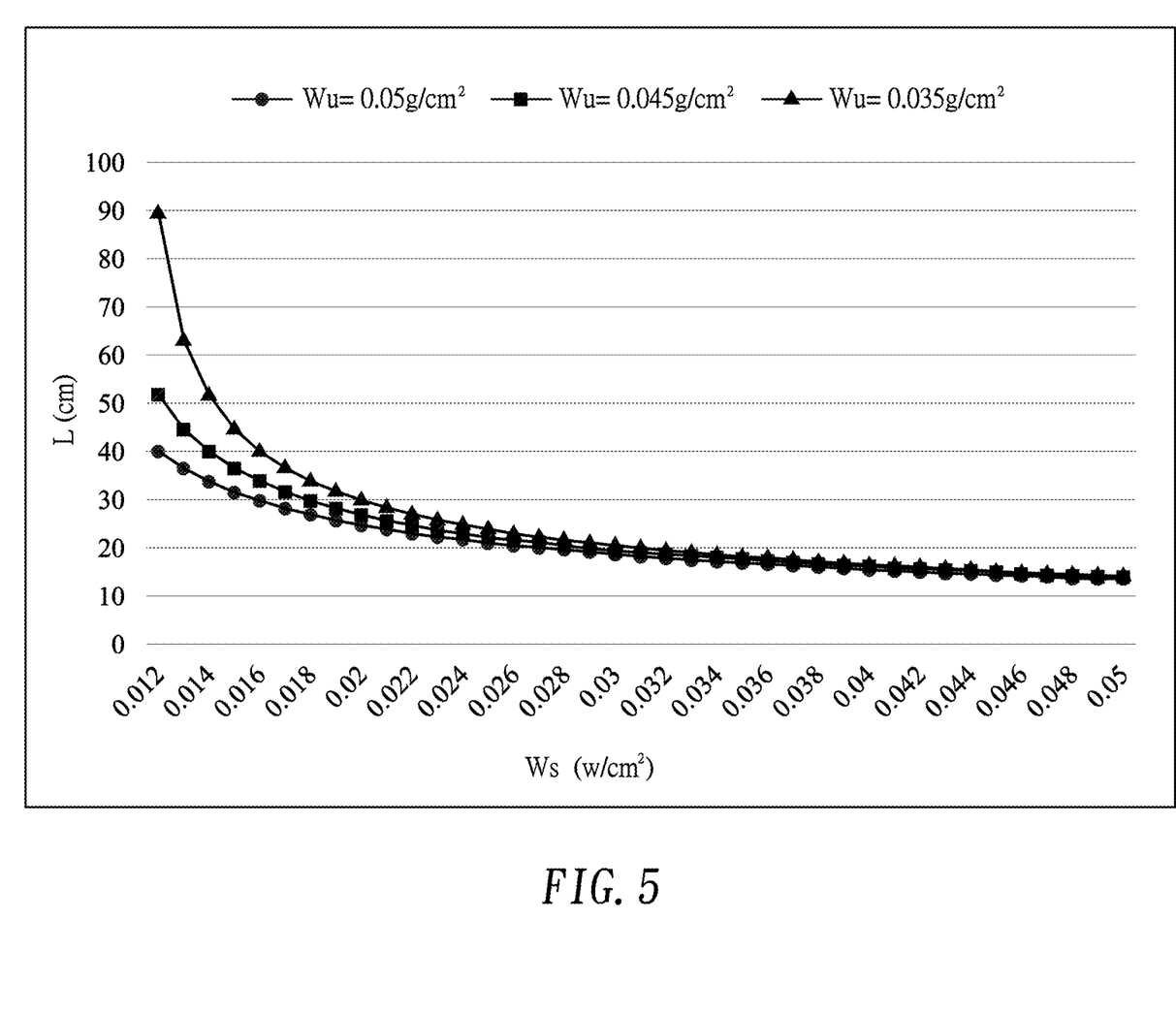
FIG. 5 is a chart showing relationships between the size and the power generated per unit area of a solar cell module of a small rotorcraft unmanned aerial vehicle (UAV) in accordance with an embodiment of this invention.

FIG. 5 is a chart showing relationships between the sizes (length scales) and power generated per unit area of the solar cell module according to equation (7), where y-axis (vertical axis) is the length scale of solar cell module (L (cm), At=$L^2$), x-axis (horizontal-axis) is the power generated per unit area of solar cell module (W/$cm^2$), and where the fuselage weight is fixed at 40 g, the lift-conversion efficiency of motor Y is fixed at 5 g/W, and the weight per unit area of the solar cell module is fixed at Wu=0.055 g/$cm^2$, 0.045 g/$cm^2$, and 0.035 g/$cm^2$, respectively.

Referring to FIG. 5, when the power generated per unit area of the solar cell module is increased to 0.03 W/$cm^2$ (identifying with a solar cell module having efficiency 30%), the length scale of the solar cell module can be less than 20 cm. In addition, as the power generated per unit area of the solar cell module is increased to an extent, the weight per unit area of the solar cell module becomes less important. When the power generated per unit area of the solar cell module is raised to 0.05 W/$cm^2$ (identifying with a solar cell module having a conversion efficiency of 50%), the length scale of the solar cell module can be less than 15 cm. This means the size of the UAV can be significantly decreased on condition that the performance of the solar cell module is good enough to an extent. In one embodiment, the UAV is square-shaped with a length scale essentially same as the length scale of the solar cell module.

Figure 6A:
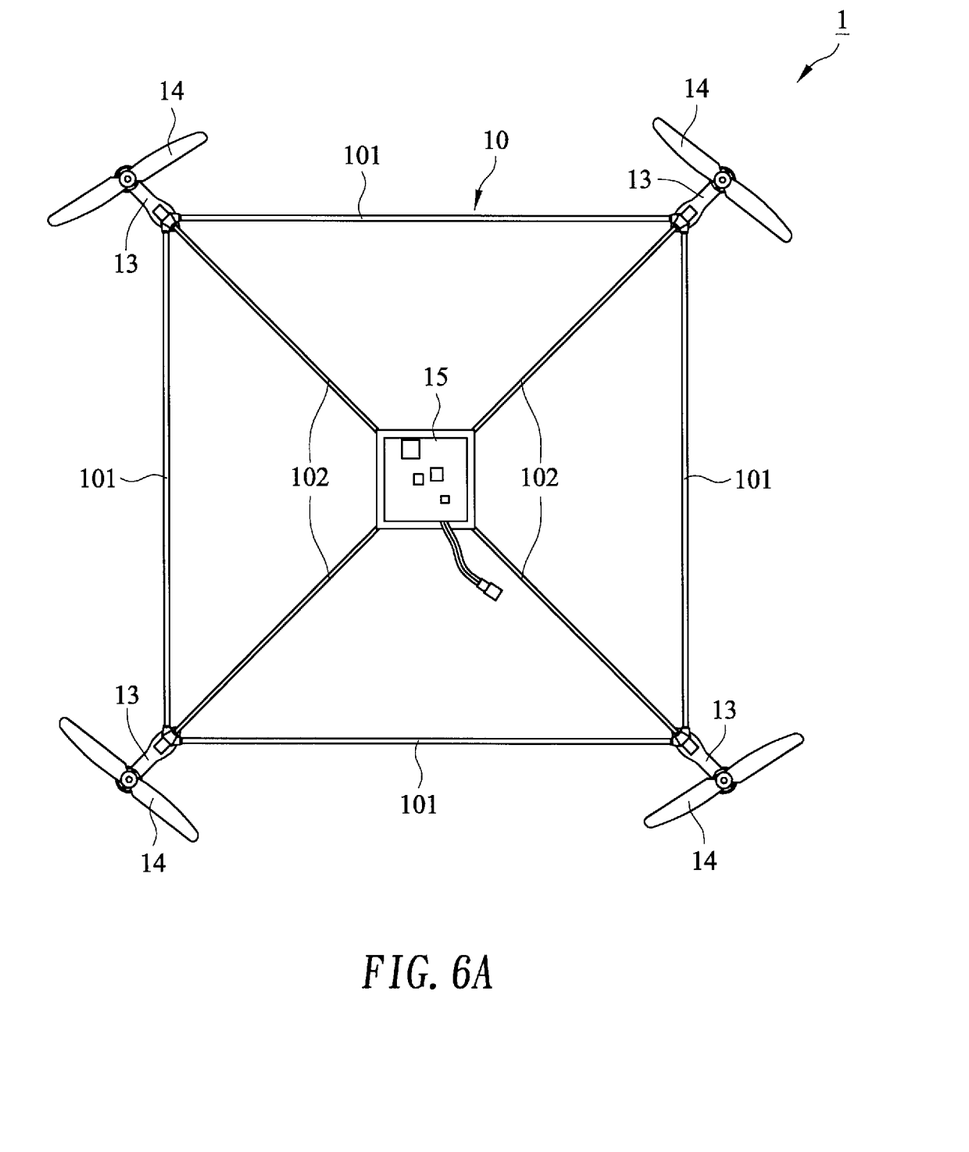
FIG. 6A is a top view showing a frame, a circuit board, motors, and propellers of a small rotorcraft unmanned aerial vehicle (UAV) in accordance with an embodiment of this invention.
Figure 6B:
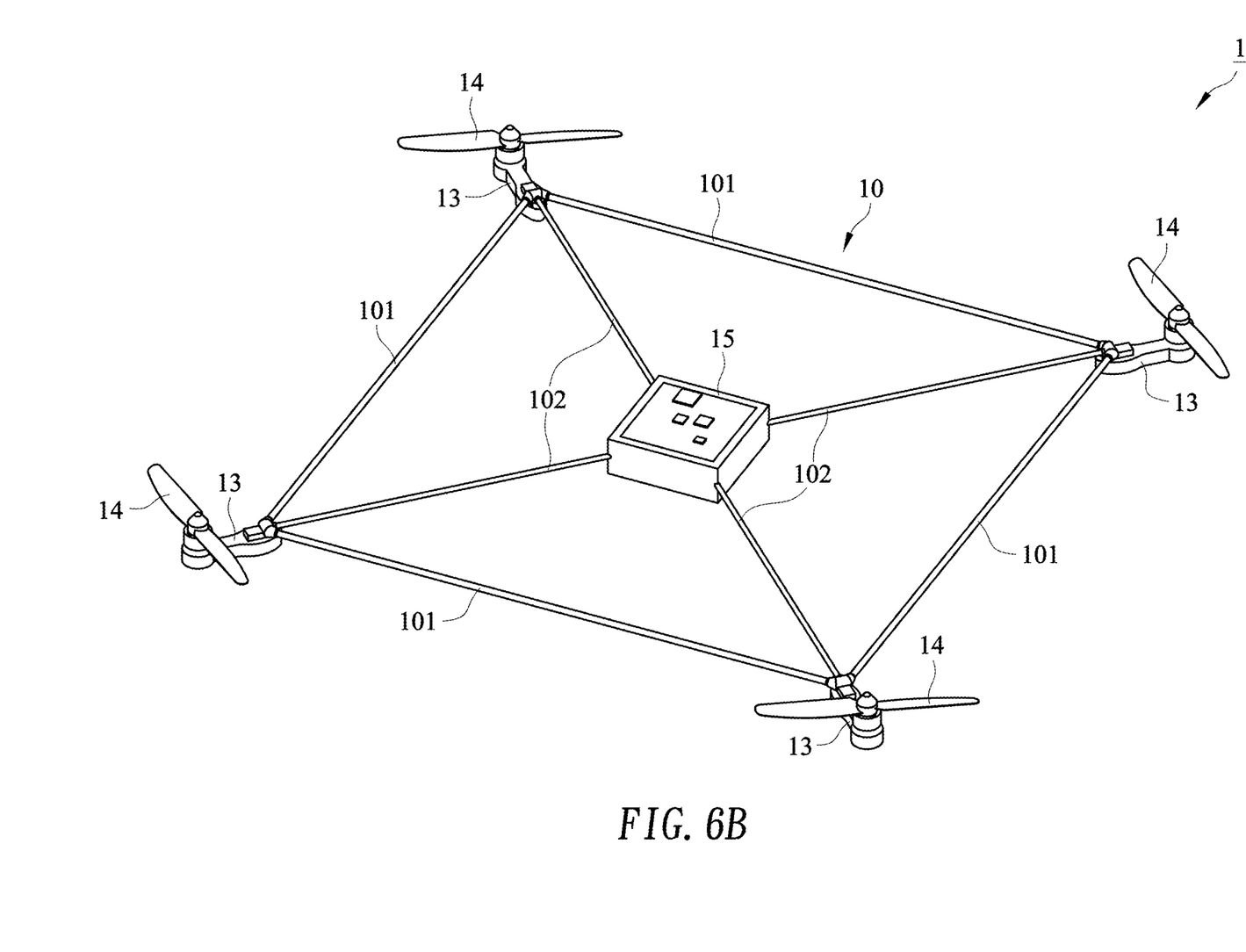
FIG. 6B is a perspective diagram showing a frame, a circuit board, motors, and propellers of a small rotorcraft unmanned aerial vehicle (UAV) in accordance with an embodiment of this invention.
Figure 7A:
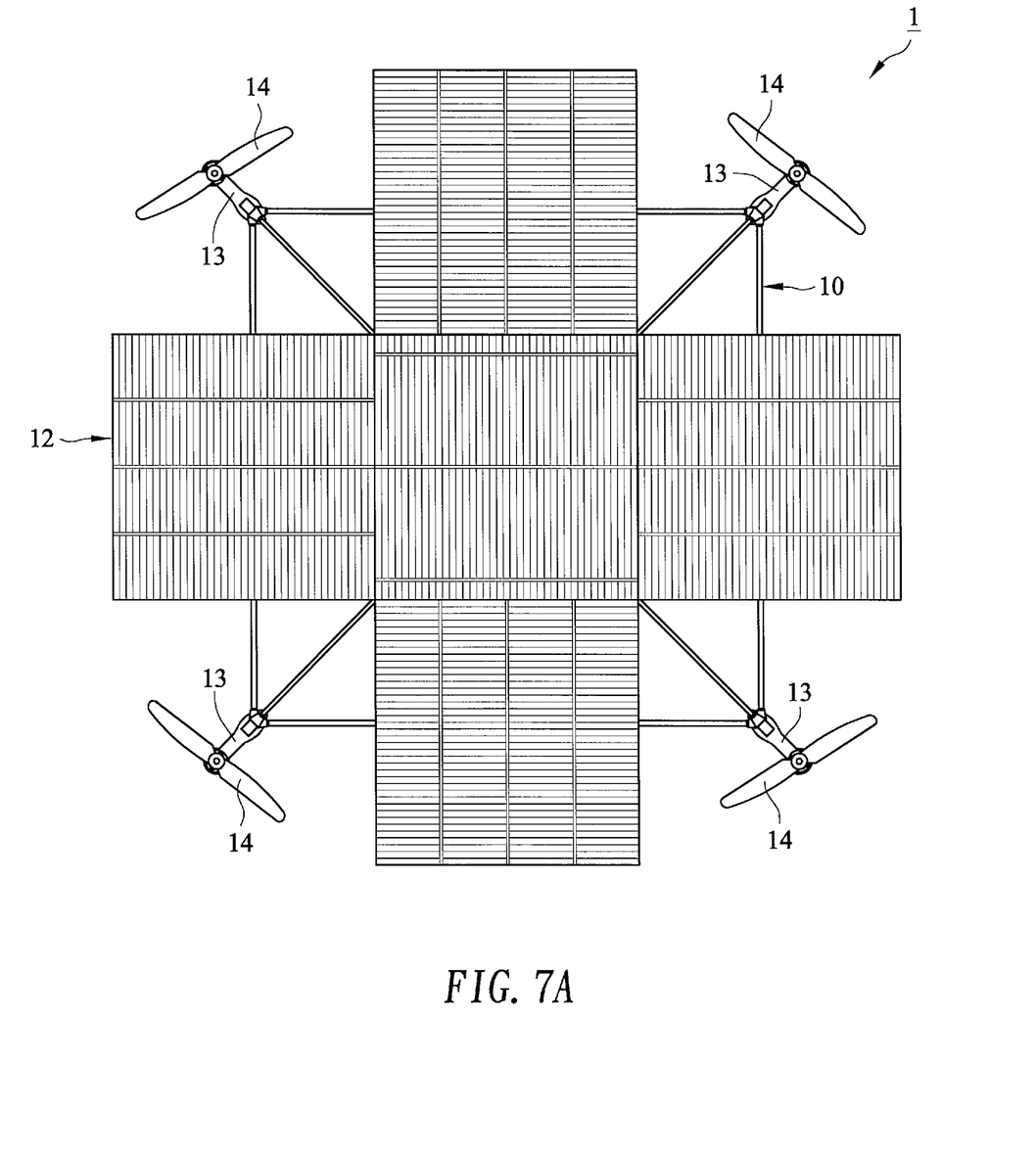
FIG. 7A is a top view showing a small rotorcraft unmanned aerial vehicle (UAV) in accordance with an embodiment of this invention.
Figure 7B:
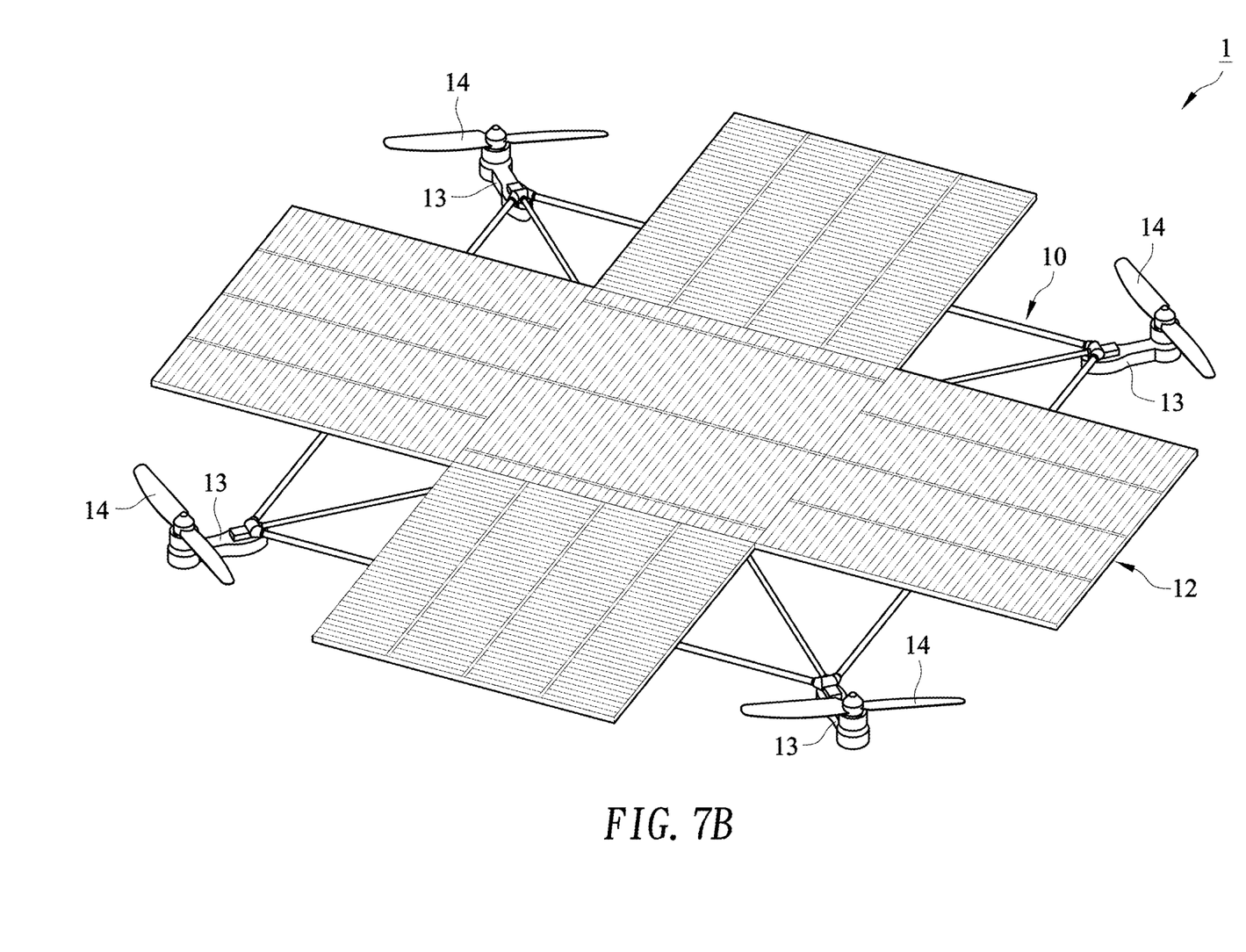
FIG. 7B is a perspective diagram showing a small rotorcraft unmanned aerial vehicle (UAV) in accordance with an embodiment of this invention.

FIGS. 6A and 6B are a top view and front view, respectively, showing a fuselage 10 of a UAV 1 in accordance with an embodiment of this invention. FIGS. 7A and 7B are a top view and front view, respectively, showing the UAV 1 capable of flying by using power generated by the solar cell module 12.

Referring to FIGS. 6A-7B, in order to fly by using power generated by the solar cell module 1, the parameters of the UAV 1 meets the requirements of the above-discussed one or more equations. For example, the area (At) of the solar cell module 12 meets the requirements defined in equation (7): At≥G0/(Y×Ws−Wu).

Referring to FIGS. 6A-7B, the solar cell module 1 may be composed of many solar cells and types of the solar cell may include, but are not limited to: crystalline silicon solar cells, thin-film solar cells (e.g., CdTe thin-film solar cell), perovskite solar cells, organic solar cells, or copper indium gallium diselenide (CIGS) solar cells.

Due to the limitation in size and weight, the area of the solar cell module 1 is needed to be small, and therefore the solar cell module 1 is composed of many solar cells connected in series to achieve a required output voltage. Conventional small UAVs employ a so-called is cell with an output voltage between 3.7 v and 4.2 v. For silicon solar cells, they need eight cells connected in series to achieve the same output voltage. And the power of the solar cell module is about 15-20 W. In one embodiment, each solar cell has an area 5 cm×3 cm and an out voltage 0.55 v, and after eight of them are connected in series, the total area is 8×15 $cm^2$=120 $cm^2$ and the total output voltage is 4.4 v. In another embodiment, if the required area of the solar cell module 12 is 720 $cm^2$, the solar cell module 12 can be divided into six sets connected in parallel, and each set is composed of eight solar cells (5 cm×3 cm) connected in series.

According to the embodiment of this invention, the solar cell may be rectangular, square, or hexagonal. These configurations allow easy assembly and minimum gap between the solar cells. Such design has advantages that the total area of the solar cell module is not too big, and the solar cell occupy most of the sight with minimum gap between the solar cells when viewing the UAV 1 from top.

In this embodiment, referring to FIGS. 6A-7B, the fuselage of the UAV comprises a frame 10, four motors 13, four propellers 14, and a circuit board 15. The fuselage weight as mentioned in equations of this invention is the sum of the weight of frame 10, four motors 13, four propellers 14, and circuit board 15.

While the embodiment is described with specific regard to a UAV with a square frame 10 and four propellers and motors, it is to be appreciated that embodiments of the invention are not so limited and that certain embodiments may have other configurations and quantities. In some embodiments, the frame is round or polygon-shaped. In some embodiments, the quantity of both propellers and motors differs from four.

Currently available small UAVs include a big propeller engaged with a gear so that the big propeller can be driven by a motor. However, the overlap between the big propeller and the solar cell module is large, and the total area of the UAV is the rotation area of the propeller plus the area of the solar cell module, resulting in a UAV with a big size. In contrast, four propellers 14 are employed in the embodiments of this invention, with each being driven by a corresponding motor 13. The diameter of each propeller 14 is not greater than 75 mm By doing so, the rotation of propellers 14 occupies a small area, and the total area of UAV is dominated by the area of the solar cell module and will not be too large.

Referring to FIGS. 6A-7B, the total weight of the UAV 1 is the sum of the weight of frame 10, solar cell module 12, motors 13, propellers 14, and circuit board 15, and is preferably less than 150 g.

To be firm and light, the frame 10 of this embodiment is made of carbon-fibers or other light-weight materials. Referring to FIGS. 6A and 6B, the frame 10 may comprise supporting arms 101 and supporting strips 102. Preferably, the supporting arms 101 and supporting strips 102 are made of carbon-fibers or other light-weight materials that are strong enough to support the motors 13, propellers 14, circuit board 15, and solar cell module 12. The frame 10 can be square with a length less than 30 cm. In other embodiments, the length of the frame 10 can be increased or decreased as discussed before. In this embodiment, the total weight of the frame 10, propellers 14, and circuit board 15 is 20 g, the weight of four motors 13 is 4×5=20 g, the weight of the solar cell module 12 is 27 g, and the total weight of the UAV 1 is about 67 g. While the embodiment is described with specific weight, it is to be appreciated that embodiments of the invention are not so limited and that certain embodiments may use frame, motors, propellers, and circuit board having other weights, as long as the total weight of UAV can meet the mentioned requirements to take off the UAV.

In sum, this invention provides small-scale UAVs that can use solar energy as the only driving force for flight and have the advantages of energy saving, environmental protection, light weight, and convenient portability.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A solar powered unmanned aerial vehicle (UAV), comprising:
    a plurality of propellers to propel the UAV;
    one or more motors to drive the plurality of propellers;
    a circuit board electrically connecting with the one or more motors;
    a frame to support the propellers and the one or more motors; and
    a solar cell module comprising a plurality of solar cells and electrically connecting with the circuit board;
    wherein the solar cell module provides power for the one or more motors to drive the propellers, and the size of the UAV is less than 60 cm×60 cm;
    wherein the weight per unit area of the solar cell module is G1 (g/cm2), and G1 satisfies $G1 \leq Y \times S \times \eta - G0/A$, where G0 denotes the total weight of the frame, the one or more motors, the propellers, and the circuit board, Y is the efficiency of each motor, A denotes the surface area of the solar cell module, $\eta$ denotes the conversion efficiency of the solar cell module, and S (W/cm$^2$) denotes the intensity of the sun.

2. The unmanned aerial vehicle as recited in claim 1, wherein the size of the UAV ranges from 15 cm×15 cm to 60 cm×60 cm.

3. The unmanned aerial vehicle as recited in claim 1, wherein the size of the UAV is less than 50 cm×50 cm.

4. The unmanned aerial vehicle as recited in claim 1, wherein the efficiency of each motor is Y (g/W), and Y satisfies $Y \geq (G0/S \times A \times \eta) + G1/S \times \eta$, where G0 denotes the total weight of the frame, the one or more motors, the propellers, and the circuit board, G1 (g/cm$^2$) denotes the weight per unit area of the solar cell module, A denotes the surface area of the solar cell module, $\eta$ denotes the conversion efficiency of the solar cell module, and S (W/cm$^2$) denotes the intensity of the sun.

5. The unmanned aerial vehicle as recited in claim 1, wherein the UAV carries a component with a weight C, and G1 satisfies the formula: $G1 \leq Y \times S \times \eta - (G0+C)/A$.

6. The unmanned aerial vehicle as recited in claim 1, wherein the area of the solar cell module is At, and At satisfies the formula: $At \geq G0/(Y \times Ws - Wu)$, where Ws (W/cm$^2$) denotes the power generated per unit area of the solar cell module, G0 denotes the total weight of the frame, the one or more motors, the propellers, and the circuit board, and Y (g/W) denotes the efficiency of each motor.

7. The unmanned aerial vehicle as recited in claim 1, wherein the weight per unit area of the solar cell module ranges between 0.01 g/cm$^2$ and 0.15 g/cm$^2$.

8. The unmanned aerial vehicle as recited in claim 7, wherein the weight per unit area of the solar cell module ranges between 0.035 g/cm$^2$ and 0.1 g/cm$^2$.

9. The unmanned aerial vehicle as recited in claim 1, wherein, the total weight of the frame, the one or more motors, the propellers, and the circuit board ranges between 15 g and 60 g.

10. The unmanned aerial vehicle as recited in claim 1, wherein the efficiency of each motor ranges between 4 g/W and 15 g/W.

11. The unmanned aerial vehicle as recited in claim 1, wherein the power generated per unit area of the solar cell module ranges between 0.012 W/cm$^2$ and 0.075 W/cm$^2$.

12. The unmanned aerial vehicle as recited in claim 1, wherein the weight of the solar cell module is equal to or less than 27 g.

13. The unmanned aerial vehicle as recited in claim 1, wherein the total weight of the UAV is no more than 150 g.

14. The unmanned aerial vehicle as recited in claim 1, wherein the number of the one or more motors equals to the number of the propellers, and each propeller is driven by one corresponding motor.

* * * * *